United States Patent
Neyrinck

(10) Patent No.: US 12,144,285 B2
(45) Date of Patent: Nov. 19, 2024

(54) MOVING DUST SCREEN FOR A COOLER OF A WORK VEHICLE

(71) Applicant: CNH Industrial America LLC, New Holland, PA (US)

(72) Inventor: Bert Neyrinck, Snellegem (BE)

(73) Assignee: CNH Industrial America LLC, New Holland, PA (US)

( * ) Notice: Subject to any disclaimer, the term of this patent is extended or adjusted under 35 U.S.C. 154(b) by 372 days.

(21) Appl. No.: 17/622,109

(22) PCT Filed: Jun. 25, 2020

(86) PCT No.: PCT/EP2020/067925
§ 371 (c)(1),
(2) Date: Dec. 22, 2021

(87) PCT Pub. No.: WO2020/260517
PCT Pub. Date: Dec. 30, 2020

(65) Prior Publication Data
US 2022/0361403 A1  Nov. 17, 2022

(30) Foreign Application Priority Data
Jun. 25, 2019  (EP) .................................... 19182256

(51) Int. Cl.
*A01D 41/12* (2006.01)
*B60K 11/08* (2006.01)
*F01P 11/12* (2006.01)

(52) U.S. Cl.
CPC .......... *A01D 41/1252* (2013.01); *B60K 11/08* (2013.01); *F01P 11/12* (2013.01); *B60Y 2200/222* (2013.01)

(58) Field of Classification Search
CPC ................ A01D 41/1252; B60K 11/08; B60Y 2200/222; B60S 1/32; F01P 11/12; F01P 1/06
See application file for complete search history.

(56) References Cited

U.S. PATENT DOCUMENTS 1,814,428 A * 7/1931 Bishop .................. B01D 46/18
                                                                55/351
3,309,847 A    3/1967 Donaldson
(Continued)

FOREIGN PATENT DOCUMENTS

DE          20104086      2/2002
EP          1099837       5/2001
(Continued)

OTHER PUBLICATIONS

International Search Report and Written Opinion issued in PCT/EP2020/067925 Dated Nov. 19, 2020 (12 pages).
(Continued)

*Primary Examiner* — Syed O Hasan
(74) *Attorney, Agent, or Firm* — Peter K. Zacharias; Rebecca L. Henkel; Rickard K. DeMille

(57) ABSTRACT

A cooler for a work vehicle includes at least one cooler core, a cooling fan associated with the at least one cooler core to produce a stream of air across the at least one cooler core, and a dust removal assembly including a filter associated with the at least one cooler core such that the stream of air passes through at least one collection surface of the filter. The dust removal assembly includes a suction channel placed such that it does not substantially interfere with the stream of air passing across the at least one cooler core, a blower fluidly coupled to the suction channel and configured to produce a suction region in and adjacent to the suction channel, and a filter carrier configured to carry at least a (Continued)

portion of the filter through the suction region such that particles captured by the filter are pulled into the suction channel.

20 Claims, 7 Drawing Sheets

(56) References Cited

U.S. PATENT DOCUMENTS

| | | |
|---|---|---|
| 4,509,961 A | 4/1985 | Jones |
| 2008/0261507 A1* | 10/2008 | D'hondt ............. A01D 41/1252 |
| | | 454/284 |
| 2008/0283220 A1* | 11/2008 | Martin .................... F01P 11/12 |
| | | 165/95 |
| 2009/0211208 A1 | 8/2009 | Johnson et al. |
| 2014/0190140 A1 | 7/2014 | Hovenga et al. |
| 2019/0184811 A1* | 6/2019 | Ivey ......................... B60S 1/62 |

FOREIGN PATENT DOCUMENTS

| | | |
|---|---|---|
| FR | 2441325 | 6/1980 |
| WO | WO 2012/159847 | 11/2012 |
| WO | WO 2015/197602 | 12/2015 |

OTHER PUBLICATIONS

European Search Report issued in EP19182256.8 Dated Dec. 19, 2019 (6 pages).

* cited by examiner

MOVING DUST SCREEN FOR A COOLER OF A WORK VEHICLE

CROSS-REFERENCE TO RELATED APPLICATIONS

The present application is a national phase application of PCT International Application No. PCT/EP2020/067925, filed Jun. 25, 2020, which, in turn, is based upon and claims the right of priority to EP patent application Ser. No. 19/182,256.8, filed Jun. 25, 2019, the disclosures of both of which are hereby incorporated by reference herein in their entirety for all purposes.

BACKGROUND OF THE INVENTION

The present invention relates to work vehicles such as agricultural harvesters and, more specifically, to coolers used in such harvesters.

In work vehicles, such as agricultural harvesters, many of the components generate heat during normal operation. Excessive produced heat can cause damage to the components and surrounding components, as well as undesirably alter performance characteristics of the components. This is a particular issue in hydraulic motors, pumps, and gearboxes, where control of the temperature of the fluid, such as oil, can be important to operation.

In order to manage heat generated during operation, many vehicles are equipped with liquid-to-air coolers that direct relatively cool air across surfaces heated by the relatively hot liquid in order to remove the heat from the liquid, which is then returned to the source component. The heated surfaces are generally formed of a thermally conductive material, such as a metal, to increase the heat flow rate between the heated surfaces and the cool air. Many such coolers have multiple cores that are fluidly separated from one another in order to keep the liquids being cooled separated from one another and avoid intermixing of the different types of fluids. The cores of the cooler can be separated, for example, by walls within the cooler which fluidly separate each individual core.

Heat is efficiently removed from the cooler cores when the cool air contacts a thermally conductive material. However, the work vehicles are often used in areas where debris particles, such as dust, tend to be entrained in the cooling air. Since dust and other debris particles tend to act as thermal insulators when covering the cooler surfaces, the cooler performance diminishes when excessive dust collects on the cooler cores.

To prevent excessive dust accumulation on the cooler cores, many coolers are equipped with screens and other constructions that trap dust so that dust does not accumulate on the cooler cores. The screen may then be removed for cleaning or replaced so that excessive amounts of dust do not accumulate on the screen. One such construction is known from U.S. Pat. No. 3,309,847, which includes a rotating mesh with a channel at the bottom of the cooler for collecting and removing dust. As the mesh rotates around a pair of cylinders, gravity and the rotational action of the mesh dislodge dust from the mesh, which then falls into the channel.

In the construction described by U.S. Pat. No. 3,309,847, the removal of dust from the mesh essentially relies on the dust "free-falling" into the channel for removal. Considering that the air flow into the cooler is relatively high, a significant amount of dust that is dislodged from the mesh is pulled into the cooler by the air flow, negating the purpose of the mesh.

What is needed in the art is a cooler with the ability to continuously trap and remove dust and other debris particles.

SUMMARY OF THE INVENTION

Exemplary embodiments disclosed by the present disclosure provide a dust removal assembly with a filter carrier that carries a filter through a suction region such that particles captured by the filter are pulled into a suction channel for removal.

The invention in one form is directed to a cooler for a work vehicle, in particular an agricultural harvester. The cooler includes at least one cooler core, a cooling fan associated with the at least one cooler core to produce a stream of air across the at least one cooler core, and a dust removal assembly including a filter associated with the at least one cooler core such that the stream of air passes through the filter. The cooler is characterized in that the dust removal assembly further includes a suction channel, a blower fluidly coupled to the suction channel and configured to produce a suction region in and adjacent to the suction channel, and a filter carrier configured to carry at least a portion of the filter through the suction region such that particles captured by the filter are pulled into the suction channel.

In another form of the invention, the suction channel defines a length and a channel width that varies along at least a portion of the length.

In another form of the invention, the filter carrier is configured to rotate or translate to carry the filter through the suction region.

In another form of the invention, the filter carrier is configured to rotate and includes a rotatable roller and at least one additional roller, the filter being wrapped around the rotatable roller and the at least one additional roller.

In another form of the invention, the filter carrier is configured to translate the filter in a translation direction through the suction region and the filter defines a filter dimension that is at least twice a corresponding cooler core dimension of the cooler core, the filter dimension and the corresponding cooler dimension both extending in the translation direction.

In another form of the invention, the cooler further comprises an additional suction channel fluidly coupled to the blower and located on a side of the cooler opposite the suction channel.

In yet another form of the invention, the blower includes a blower duct configured to direct particles pulled from the filter away from the cooler.

In yet another form of the invention, the at least one cooler core defines a cooler core surface area and the filter defines a filter surface area that is at least equal to the cooler core surface area.

In yet another form of the invention, the cooler defines a top, a bottom, and a pair of lateral sides and the suction channel extends along one of the lateral sides of the cooler.

In yet another form of the invention, a plate is provided that is configured to seal a region between a rear surface of the filter and the suction channel.

In yet another form of the invention, the filter carrier is configured to carry entirety of the at least one collection surface through the suction region.

In yet another form of the invention, the filter carrier is configured to continuously or selectively carry the portion of the filter through the suction region.

In a further form of the invention, a work vehicle includes a chassis that carries the previously described cooler.

In a still further form of the invention, the work vehicle is an agricultural harvester.

One possible advantage that may be realized by exemplary embodiments disclosed herein is that the filter traveling through the suction region can pull dust and other debris off the filter with little, if any, influence on or effect from the stream of air produced by the cooling fan.

Another possible advantage that may be realized by exemplary embodiments disclosed herein is that the captured dust can be continuously removed from the filter.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
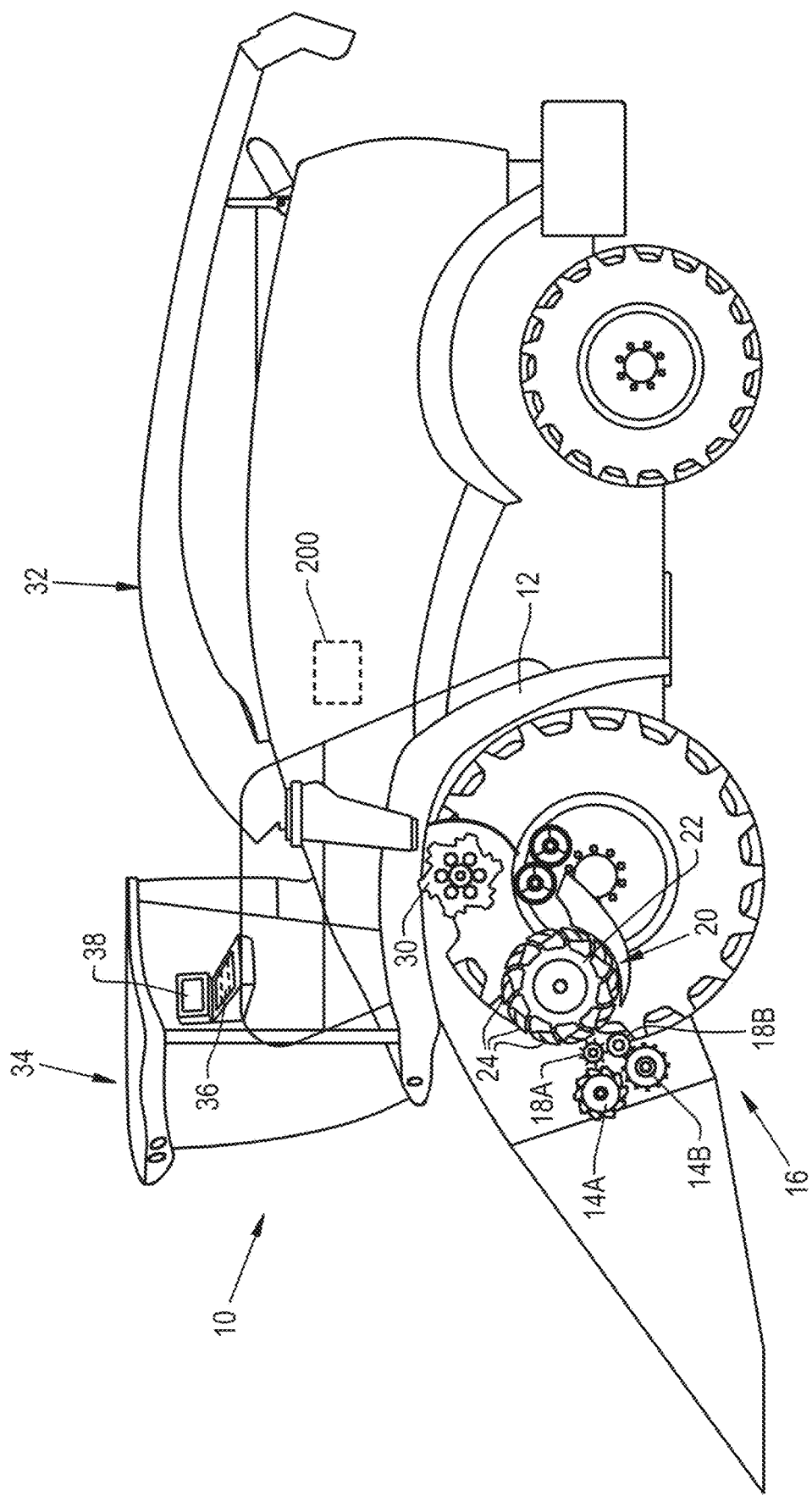
FIG. 1 is a partially cut-away side view of an exemplary embodiment of a work vehicle provided in accordance with the present disclosure.

Referring now to the drawings, and more particularly to FIGS. 1-2, there is shown a work vehicle 10 in the form of an agricultural harvester which includes a chassis 12, a pair of front feed rolls 14A, 14B carried by the chassis 12 adjacent a front 16 of the harvester 10, a pair of rear feed rolls 18A, 18B behind the front feed rolls 14A, 14B, and a cutter head 20 including a cutter drum 22 which rotates a plurality of cutting knives 24. While the work vehicle 10 is illustrated as an agricultural harvester in the form of a forage harvester, it should be appreciated that the present invention is not limited to implementation in agricultural harvesters, such as forage harvesters, and can be applied to other work vehicles that incorporate coolers. The forage harvester 10 can also include an accelerator 30 which rotates to send cut crop material out of a discharge spout 32 and an operator cabin 34 where an operator may control actions of the harvester 10. The operator cabin 34 may include, for example, a controller 36 operably coupled to a display 38, which can be a touchscreen that an operator can utilize to control various operation functions of the harvester 10. The controller 36 may be, for example, an electronic processing circuit including a central processing unit and a memory which is operatively coupled to components of the work vehicle 10 and configured to control various functions thereof. It should be appreciated that the aforementioned elements of the work vehicle 10 may be of any suitable construction for performing their respective functions.

Figure 2B:
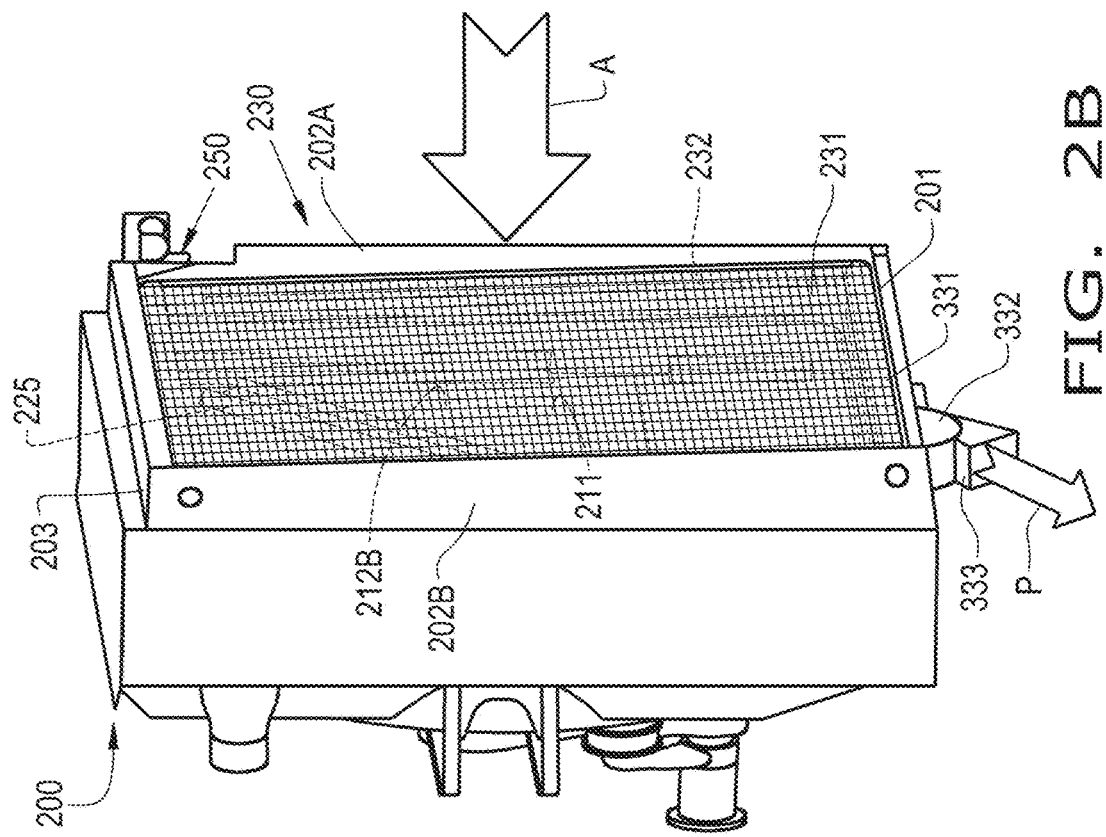
FIG. 2B is another perspective view of the cooler illustrated in FIG. 2A.
Figure 2A:
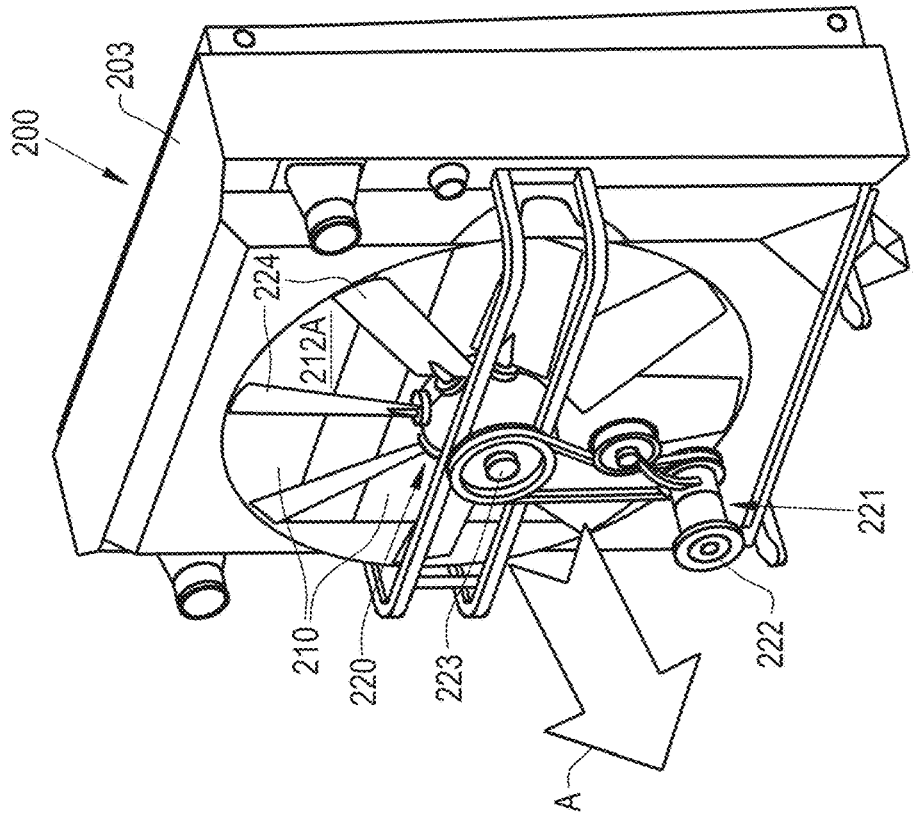
FIG. 2A is a perspective view of an exemplary embodiment of a cooler provided in accordance with the present disclosure.

Referring now to FIGS. 2A-2B, an exemplary embodiment of a cooler 200 that may be carried by the chassis 12 to cool one or more components of the work vehicle 10 is illustrated. The cooler 200 generally includes one or more cooler cores 210, a cooling fan 220 associated with the cooler core(s) 210, and a dust removal assembly 230 associated with the cooler core(s) 210. As illustrated, the cooler 200 includes multiple cooler cores 210 that together form a cooling package to cool components of the work vehicle 10. The cooler cores 210 together have a cooler surface 211 defining a cooler surface area, which may have a rectangular cross-section. The cooler cores 210 comprise a thermally conductive material, such as a metal, to exchange heat with cooling air directed across the cooler surface 211, as will be described further herein.

In some embodiments, the cooling fan 220 is placed on one side 212A of the cooler cores 210, which may be a rear side of the cooler cores 210, and the dust removal assembly 230 is placed on an opposite side 212B of the cooler cores 210, which may be a front side of the cooler cores 210. In such a configuration, the cooling fan 220 is configured to produce a stream of air, illustrated as arrow A, across the cooler cores 210 by pulling the stream of air A through the cooler cores 210. It should be appreciated that the cooling fan 220 may be configured to produce the stream of air A across the cooler cores 210 by being placed on the same side 212B as the dust removal assembly 230, in which case the cooling fan 220 blows the stream of air A across the dust removal assembly 230 and the cooler cores 210. The cooling fan 220 may be powered by the connection of a pulley system 221 to a driving shaft 222, which may be a power take off shaft or connected to a power take off shaft. The pulley system 221 is coupled to a fan shaft 223 to which multiple fan blades 224 attach such that rotation of the driving shaft 222 causes the fan shaft 223 and attached fan blades 224 rotate. It should be appreciated that the cooling fan 220 may be powered in other ways, and the previously described way is exemplary only. The fan shaft 223 may also drive an agitator 225 that, during rotation, creates a low pressure area adjacent to the cooler surface 211 to agitate dust and other particles that makes it through the dust removal assembly 230, with the agitated particles falling down or through the cooler cores 210 rather than accumulating on the cooler surface 211.

The dust removal assembly 230 includes a filter 231 with at least one collection surface 232 placed such that the stream of air A, which may have dust and other debris particles entrained therein, passes through the collection surface(s) 232. In some embodiments, the filter 231 is in the form of a mesh material comprising a flexible metal weave and having filter opening sizes of between 1 mm and 4 mm. The filter openings may be, for example, square or rectangular in shape. It should be appreciated that while the filter 231 is illustrated and described as a mesh material, the filter may be a screen, membrane, or other type of construction that includes relatively small openings formed in the material of the filter to capture particles, such as dust, while allowing air flow to pass therethrough. The collection surface(s) 232 of the filter 231 may have a rectangular cross-section, similarly to the cooler cores 210, and define a collection surface area that may be at least equal to the cooler surface area of the cooler cores 210. The filter 231 having such a shape and sizing allows the filter 231 to cover an entirety of the cooler cores 210 and capture dust or other debris that is entrained by the stream of air A directed across the cooler surface 211 without reducing the effective area of the cooler surface 211.

Figure 3:
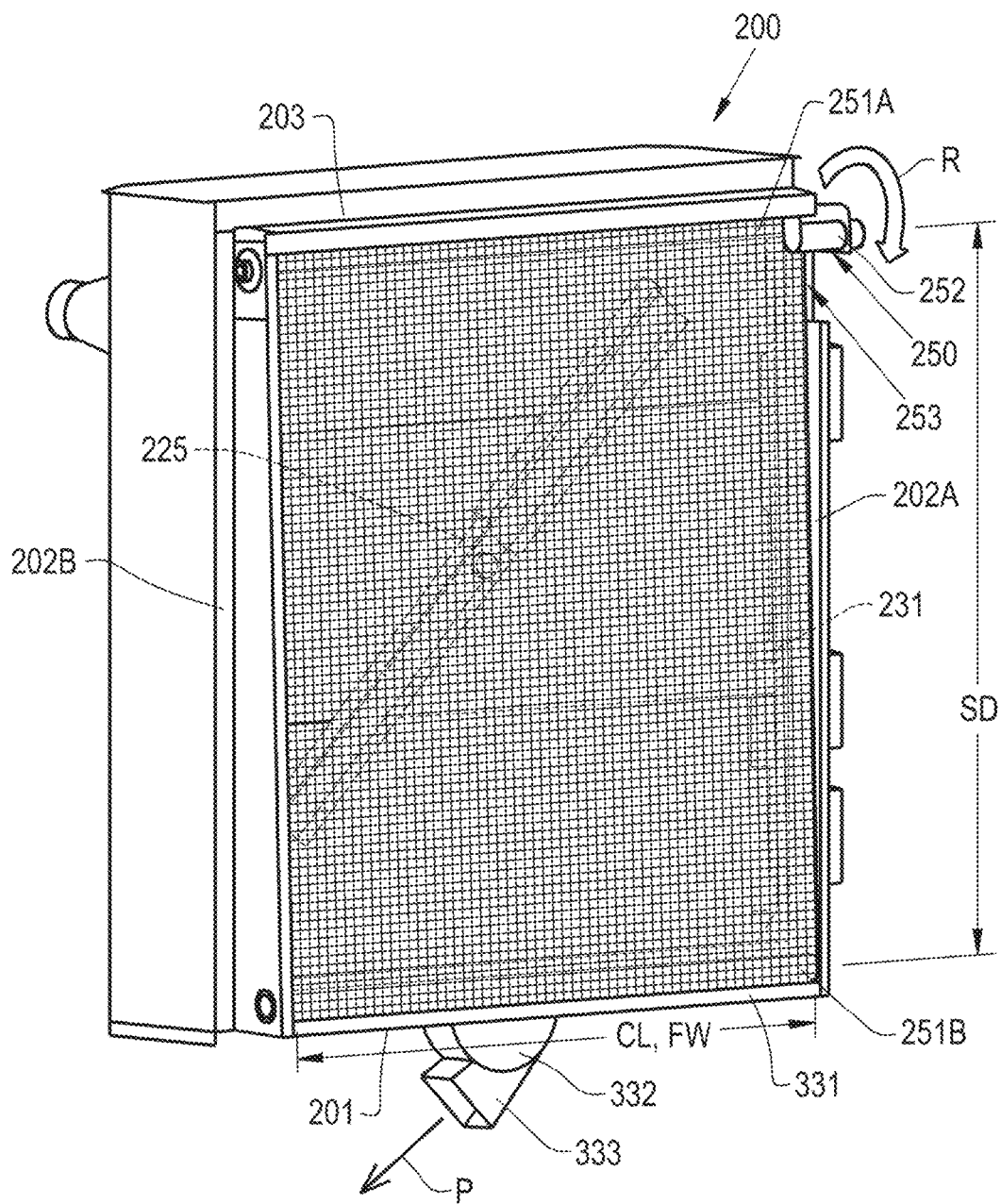
FIG. 3 is yet another perspective view of the cooler illustrated in FIGS. 2A-2B.
Figure 4:
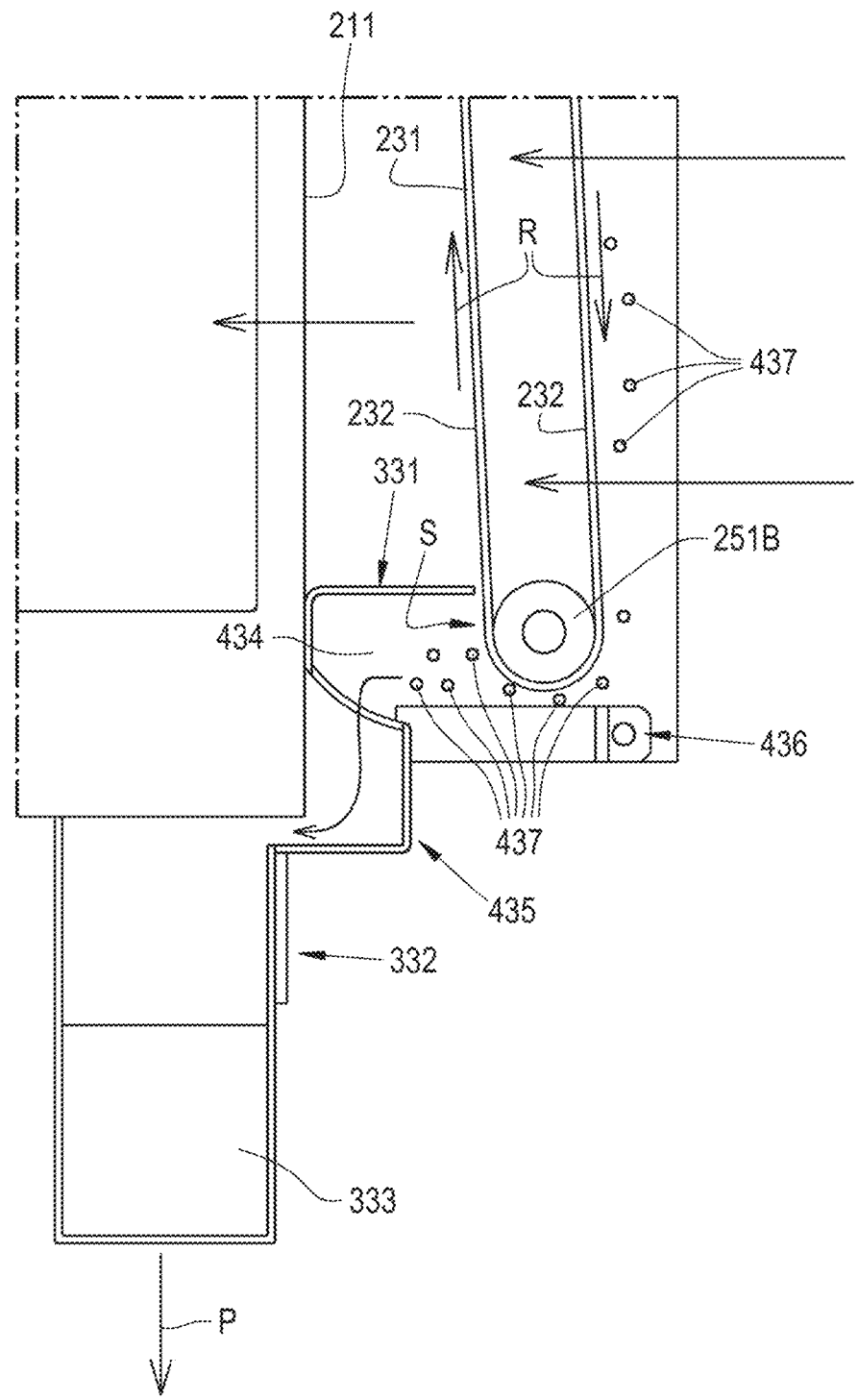
FIG. 4 is a side view of the cooler illustrated in FIGS. 2A-3 as air and particles travel through a filter of the cooler.

With continued reference to FIGS. 2A and 2B, and referring now to FIGS. 3-4 as well, it is illustrated that the dust removal assembly 230 includes a suction channel 331 that is fluidly coupled to a blower 332. The suction channel 331 is placed such that the suction channel 331 does not substantially interfere with stream of air A passing through the collection surface(s) 232, as will be described further herein. In some embodiments, the suction channel 331 extends along a bottom 201 of the cooler 200, as illustrated, between a pair of opposite lateral sides 202A, 202B of the cooler 200. The blower 332 is configured to produce a suction region S (illustrated in FIG. 4) in and adjacent to the suction channel 331. The suction region S is a region of low pressure that can pull air, and particles entrained in the air, into the suction channel 331. The air and entrained particles may then be directed out of a blower duct 333 of the blower 332 in a stream of purged air, represented by arrow P, that is directed away from the cooler 200. As illustrated in FIG. 4, the suction channel 331 may be shaped such that the vacuum produced in the suction region S pulls air (and entrained particles) toward the blower duct 333 for removal as the stream of purged air P. The suction channel 331 may, for example, have one or more curved surfaces 434 directed toward a fluid coupling 435 between the suction channel 331 and the blower 332 so air pulled into the suction region S is directed out of the blower duct 333 as the stream of purged air P. In some embodiments, a suction adjustment plate 436 is associated with the suction channel 331 to adjust the amount of vacuum (suction) produced in the suction region S, and thus the flow rate of the stream of purged air P.

The dust removal assembly 230 further includes a filter carrier 250 that is configured to carry at least a portion of the filter 231 through the suction region S such that particles captured by the filter 231 are pulled into the suction channel 331 by, for example, becoming entrained in air that is pulled into the suction channel 331. In the embodiment illustrated in FIGS. 2A-5B, the filter carrier 250 includes a pair of rollers 251A, 251B that the filter 231 wraps around to form a filter loop that may continuously (or selectively) rotate through the suction region S. To rotate the filter 231, one or both of the rollers, such as roller 251A, is a rotatable roller that may be coupled to a rotary actuator 252 that is continuously or selectively activated to rotate the coupled roller 251A, and thus rotate the filter 231 about the rollers 251A, 251B. It should be appreciated that both of the rollers 251A, 251B may be rotatable rollers that are each coupled to a respective rotary actuator for rotation and that more than two rollers may be included to form the filter loop. In some embodiments, a tensioner 253 is coupled to one or both of the rollers 251A, 251B to adjust a tension in the filter 231 wound about the rollers 251A, 251B by, for example, translating one or both of the rollers 251A, 251B to adjust a separation distance SD between the rollers 251A, 251B.

In some embodiments, the rollers 251A, 251B extend along a top 203 and bottom 201 of the cooler 200, respectively, between the pair of opposite lateral sides 202A, 202B. In this respect, the filter 231 rotates about the rollers 251A, 251B in a rotation direction, indicated by arrows R in FIG. 4, toward the bottom 201 through the suction region S, which is located adjacent to the bottom 201, before traveling back toward the top 203 of the cooler 202. Such an orientation of the rollers 251A, 251B may assist, for example, in proper guidance and tensioning of the filter 231 in the dust removal assembly 230. As the filter 231 travels through the suction region S, the suction produced in the suction region S pulls air, which entrains dust and other debris particles 437 captured by the filter 231 on the collection surface(s) 232, into the suction channel 331. The pulled air and entrained particles 437 are directed away from the cooler 200 through the blower duct 333 as the stream of purged air P, cleaning the filter 231 to reduce the risk of the filter 231 clogging and impeding cooling performance. In some embodiments, the suction channel 331 has a channel length CL that is equal to a filter width FW of the filter 231 so the entirety of the collection surface(s) 232 travel through the suction region S during a full rotation of the filter 231 about the rollers 251A, 251B.

As can be appreciated from, for example, FIGS. 3-4, the suction channel 331 is placed such that it does not substantially interfere with the stream of air A passing across the cooler core(s) 210. In other words, the suction channel 331 is placed such that it does not cover any portion of the cooler surface 211 and the produced suction region S minimally affects the stream of air A passing across the cooler surface 211, if at all, and vice versa. The suction produced in the suction region S pulls captured particles from the filter 231 with little effect on or from the stream of air A that passes through the filter 231 and across the cooler surface 211. Thus, particles pulled into the suction channel 331 are at little risk of being re-entrained by the stream of air A after being pulled from the filter 331 and blowing onto (and accumulating on) the cooler surface 211 of the cooler core(s) 210. Further, such a placement of the suction channel 331 can reduce the risk of particles accumulating on the suction channel 331 and clogging the suction channel 331 and also reduces the power requirement of the blower 332 to purge the pulled air.

Figure 5A:
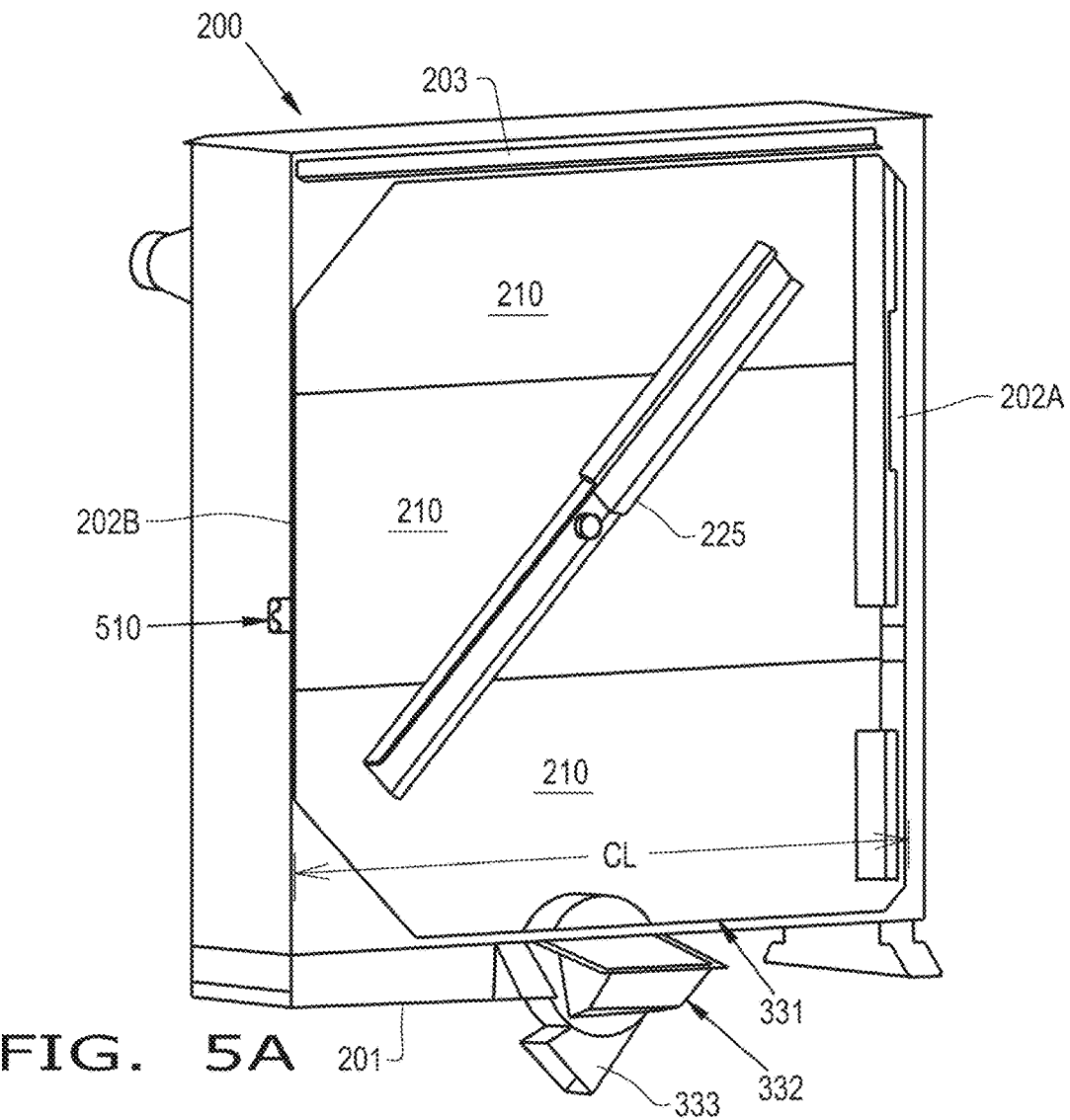
FIG. 5A is a perspective view of the cooler illustrated in FIGS. 2A-4 with the filter removed.
Figure 5B:
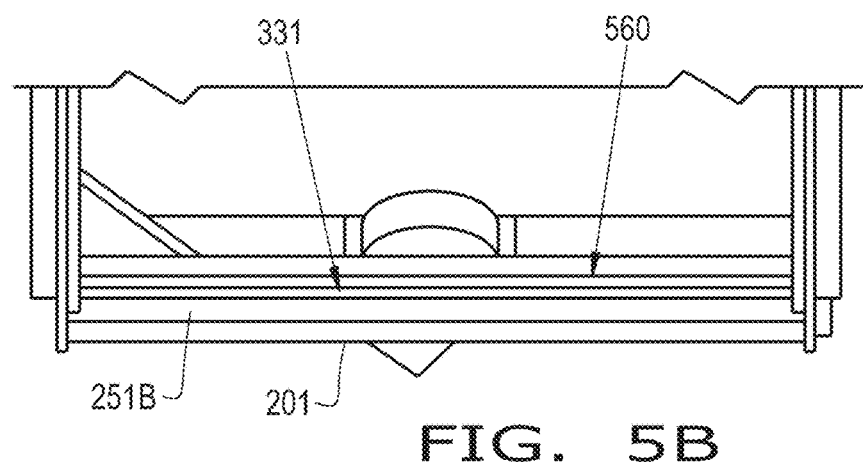
FIG. 5B is a front view of a portion of the cooler illustrated in FIGS. 2A-5A showing a plate for sealing an area of the cooler.

Referring now to FIGS. 5A-5B, a portion of the cooler 200 is illustrated. Referring specifically to FIG. 5A, the cooler 200 is illustrated with the filter 231 removed. The filter 231 may be removed by, for example, decreasing the tension in the filter 231 using the tensioner 253 and pulling the filter 231 off the rollers 251A, 251B. Removal of the filter 231 may be desired when, for example, finer debris particles are anticipated and the opening sizes of the filter are not small enough to capture the finer debris particles. In such an instance, the filter 231 may be replaced with a different filter, such as a mesh, having smaller opening sizes to capture finer debris particles. Referring specifically to FIG. 5B, a plate 560 is illustrated that is configured to seal a region between a rear surface of the filter 231 and the suction channel 331. The plate 560 may extend from the suction channel 331 and function as, for example, a baffle that helps pull air and entrained particles into the suction channel 331 from the filter 231. The plate 560 may also lightly contact the filter 231 and act as a scraper to dislodge any captured particles from the filter 231 for removal through the blower duct 333. In some embodiments, the plate 560 has a brush or similar element connected thereto that contacts the filter 231 to dislodge captured particles from the filter 231.

Figure 6:
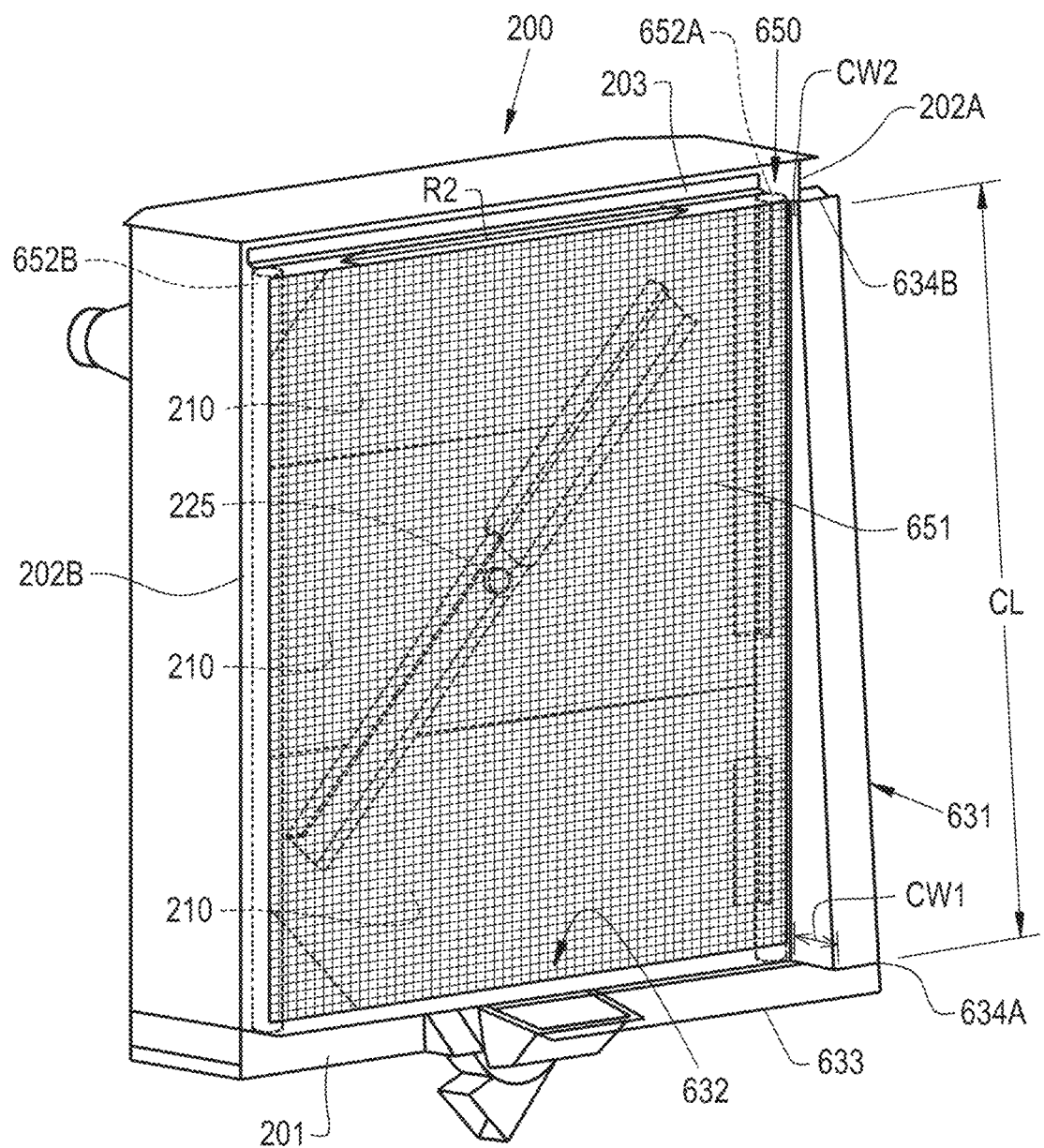
FIG. 6 is a perspective view of another exemplary embodiment of a cooler that incorporates a suction channel placed on a lateral side of the cooler.

Referring now to FIG. 6, another exemplary embodiment of a dust removal assembly 600 associated with the cooler cores 210 is illustrated that includes a suction channel 631 extending along one of the lateral sides, illustrated as lateral side 202A, rather than the bottom 201 of the cooler 200. The suction channel 631 is fluidly coupled to a blower 632, which is located at the bottom 201 of the cooler 200, by, for example, a coupling duct 633 that connects one end 634A of the suction channel 631 to the blower 632. The blower 632 is configured to produce a suction region in and adjacent to the suction channel 631, similarly to the previously described blower 332. The dust removal assembly 600 further includes a filter carrier 650 configured to carry at least a portion of a filter 651 through the suction region, similarly to the previously described filter carrier 250. The filter carrier 650 may include a pair of rollers 652A, 652B, with the filter 651 wrapped around the rollers 652A, 652B to form a filter loop that is rotated through the suction region. At least one of the rollers, such as roller 652A, is a rotatable roller to rotate the filter 651. Unlike the previously described rollers 251A, 251B, which extend along the bottom 201 and top 203 of the cooler 200, the rollers 652A, 652B each extend along a respective lateral side 202A, 202B of the cooler 200 to rotate the filter 652 through the suction region adjacent to the suction channel 631. In this sense, the filter carrier 650 functions similarly to the previously described filter carrier 250, with the primary difference being that the filter 651 is rotated in a direction R2 that extends through the lateral sides 202A, 202B of the cooler 200, rather than the top 203 and the bottom 201.

As can be appreciated from FIG. 6, the suction channel 631 extending along the lateral side 202A of the cooler 200 has one end 634A that is connected to the coupling duct 633 and relatively close to the blower 632 compared to an opposite end 634B of the suction channel 631. As the suction channel 631 is partially open to pull air (and entrained particles) into the suction region and suction channel 631, the suction in the suction region tends to be greatest adjacent to the end 634A and lower toward the opposite end 634B. In order to provide a more even suction throughout the suction region, the suction channel 631 may be formed with a channel width that varies along a channel length CL of the suction channel 631. The suction channel 631 may have, for example, a maximum channel width CW1 adjacent to the end 634A and a minimal channel width CW2 adjacent to the opposite end 634B. In this respect, the suction channel 631 may have a maximum cross-sectional area in the region where suction tends to be greatest, i.e., the region closest to the blower 632, and a minimal cross-sectional area in the region where suction tends to be least, i.e., the region furthest from the blower 632. Such a configuration may balance the suction in the suction region across the channel length CL of the suction channel 631 to uniformly pull particles into the suction channel 631. It should be appreciated that while the suction channel 631 is described as having a varying channel width along its length CL in the context of FIG. 6, the previously described suction channel 331 may also be formed to have a varying width along its length. In other respects, the dust removal assembly 600 may be similar to the previously described dust removal assembly 230, so further description thereof is omitted for the sake of brevity.

Figure 7:
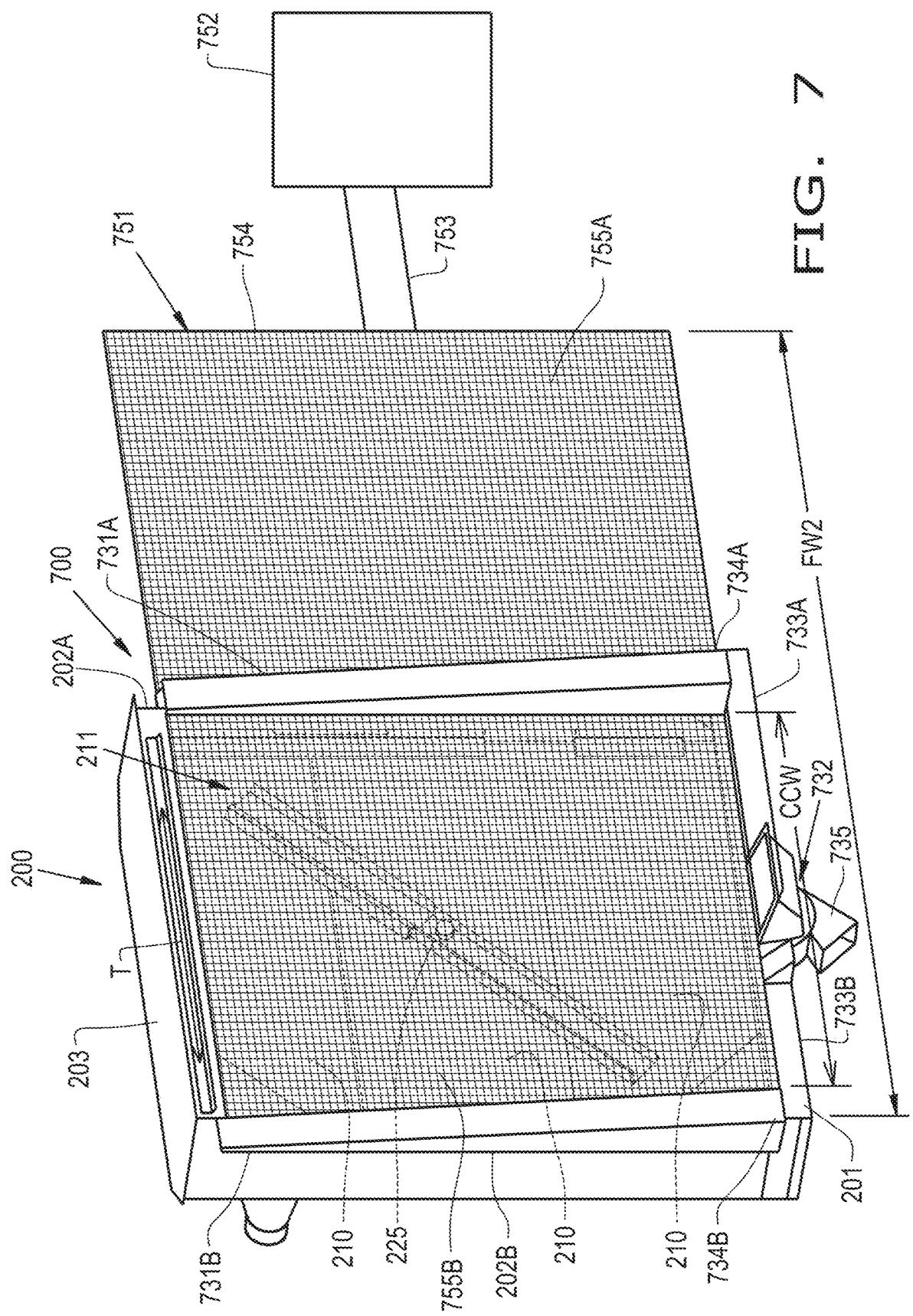
FIG. 7 is a perspective view of yet another exemplary embodiment of a cooler with a pair of suction channels and a filter carrier that translates a filter past the suction channels for cleaning.

Referring now to FIG. 7, yet another exemplary embodiment of a dust removal assembly 700 associated with the cooler cores 210 is illustrated that includes a filter carrier 750 that is configured to translate a filter 751 through suction regions formed in and adjacent to a pair of suction channels 731A, 731B that each extend along a respective lateral side 202A, 202B of the cooler 200. The suction channels 731A, 731B are each fluidly coupled to a blower 732, which is located at the bottom 201 of the cooler 200, by, for example, a respective coupling duct 733A, 733B that connects one end 734A, 734B of each suction channel 731A, 731B to the blower 732. The blower 732 is configured to produce a suction region in and adjacent to each suction channel 731A, 731B, similarly to the previously described blowers 332, 632, to pull captured particles from the filter 751 for removal via a blower duct 735 directed away from the cooler 200. The filter carrier 750 is configured to carry at least a portion of a filter 751 through the suction regions by translation, rather than rotation, in a translation direction, indicated by double-arrow T. The filter carrier 750 may include an actuator 752, such as a hydraulic, pneumatic, or electric actuator, with an actuator rod 753 connected to an edge 754 of the filter 751. In such an embodiment, extension and retraction of the actuator rod 753 translates the filter 751 in the translation direction T to carry the filter 751 through the suction regions and remove captured particles from the filter 751.

As can be appreciated from FIG. 7, the filter 751 defines a filter dimension, which in this embodiment is a filter width FW2, that is at least twice a corresponding cooler core dimension, which in this embodiment is a cooler core width CCW of the cooler core(s) 210. The filter dimension FW2 and the corresponding cooler core dimension CCW both extend in the translation direction T so the filter 751 always covers the entire cooler surface 211 as the filter carrier 750 translates the filter 751 through the suction regions that are in and adjacent to the suction channels 731A, 731B. While half of the filter 751, illustrated as a first half 755A, is translated past one of the suction channels, illustrated as the suction channel 731A, a second half 755B of the filter 751 covers the cooler core(s) 210 to capture dust and other particles that are entrained in the stream of air directed across the cooler core(s) 210. After the first half 755A of the filter 751 has fully translated for particle removal, corresponding to a full retraction of the actuator rod 753, the actuator rod 753 may extend to translate the filter 751 in the opposite direction so the second half 755B of the filter 751 is translated past the other suction channel 731B for particle removal. In this sense, the actuator rod 753 may continuously (or selectively) extend and retract to translate the filter 751 through the suction regions to pull captured particles from the filter 751. It should be appreciated that while the dust removal assembly 700 is illustrated with a filter carrier 750 configured to translate the filter 751 past suction channels 731A, 731B placed on lateral sides 202A, 202B of the cooler 200, the dust removal assembly can be modified to include a filter carrier that translates the filter past suction channels placed on the bottom 201 and the top 203 of the cooler 200. In all other respects, the dust removal assembly 700 is similar to the previously described dust removal assemblies 230, 600, so further description is omitted for the sake of brevity.

While this invention has been described with respect to at least one embodiment, the present invention can be further modified within the scope of this disclosure as defined by the appended claims. This application is therefore intended to cover any variations, uses, or adaptations of the invention using its general principles and falling within this scope. Further, this application is intended to cover such departures from the present disclosure as come within known or customary practice in the art to which this invention pertains and which fall within the limits of the appended claims.

The invention claimed is:

1. A cooler for a work vehicle, the cooler comprising:
   at least one cooler core;
   a cooling fan associated with the at least one cooler core to produce a stream of air across the at least one cooler core; and
   a dust removal assembly comprising a filter associated with the at least one cooler core such that the stream of air passes through at least one collection surface of the filter;
   wherein the dust removal assembly further comprises:
      a suction channel placed such that it does not substantially interfere with the stream of air passing across the at least one cooler core;
      a blower fluidly coupled to the suction channel and configured to produce a suction region in and adjacent to the suction channel; and
      a filter carrier configured to non-rotationally translate the filter in a translation direction through the suction region such that particles captured by the filter are pulled into the suction channel, wherein the translation of the filter results in the filter being linearly translated across at least a portion of a cooler core width dimension of the cooler core extending in the translation direction.

2. The cooler of claim 1, wherein the suction channel defines a length and a channel width that varies along at least a portion of the length.

3. The cooler of claim 1, wherein the filter defines a filter dimension that is at least twice the cooler core width dimension of the cooler core, the filter dimension and the cooler core width dimension both extending in the translation direction.

4. The cooler of claim 3, further comprising a second suction channel fluidly coupled to the blower and located on a side of the cooler opposite the suction channel.

5. The cooler of claim 1, wherein the blower comprises a blower duct configured to direct particles pulled from the filter away from the cooler.

6. The cooler of claim 1, wherein the at least one cooler core defines a cooler core surface area and the at least one collection surface defines a collection surface area that is at least equal to the cooler core surface area.

7. The cooler of claim 1, wherein the cooler defines a top, a bottom, and a pair of lateral sides and the suction channel extends along the bottom of the cooler.

8. The cooler of claim 1, wherein the cooler defines a top, a bottom, and a pair of lateral sides and the suction channel extends along one of the lateral sides of the cooler.

9. The cooler of claim 1, further comprising a plate configured to seal a region between a rear surface of the filter and the suction channel.

10. The cooler of claim 1, wherein the filter carrier is configured to carry an entirety of the at least one collection surface through the suction region.

11. The cooler of claim 1, wherein the filter carrier is configured to continuously or selectively carry the filter through the suction region.

12. A cooler for a work vehicle, the cooler defining a plurality of sides, the plurality of sides including a top side, a bottom side, and a pair of lateral sides extending between the top and bottom sides of the cooler, the cooler comprising:
   at least one cooler core;
   a cooling fan associated with the at least one cooler core to produce a stream of air across the at least one cooler core; and
   a dust removal assembly comprising a filter associated with the at least one cooler core such that the stream of air passes through at least one collection surface of the filter;
   wherein the dust removal assembly further comprises:
      a suction channel placed such that it does not substantially interfere with the stream of air passing across the at least one cooler core;
      a blower fluidly coupled to the suction channel and configured to produce a suction region in and adjacent to the suction channel; and
      a filter carrier configured to carry at least a portion of the filter through the suction region such that particles captured by the filter are pulled into the suction channel;
   wherein the suction channel defines a length and a channel width;
   wherein the suction channel extends lengthwise along a side of the plurality of sides of the cooler such that the suction region is positioned adjacent to the side of the cooler; and
   wherein the channel width of the suction channel varies along the length of the suction channel as the suction channel extends lengthwise along the side of the cooler.

13. The cooler of claim 12, wherein the suction channel is fluidly coupled to the blower via a coupling duct and wherein the suction channel extends lengthwise between a first end of the section channel positioned closest to the coupling duct and a second end of the suction channel positioned further way from coupling duct, the channel width of the suction channel narrowing as the suction channel extends lengthwise from the first end of the suction channel to the second end of the suction channel.

14. The cooler of claim 12, wherein the suction channel extends lengthwise along the bottom side of the cooler.

15. The cooler of claim 12, wherein the suction channel extends lengthwise along a lateral side of the pair of lateral sides of the cooler.

16. The cooler of claim 12, wherein the filter carrier is configured to rotate the filter through the suction region.

17. The cooler of claim 16, wherein the filter carrier further comprises a rotatable roller and at least one additional roller, the filter being wrapped around the rotatable roller and the at least one additional roller.

18. The cooler of claim 12, wherein the filter carrier is configured to non-rotationally translate the filter through the suction region.

19. The cooler of claim 18, wherein the filter carrier is configured to translate the filter in a translation direction through the suction region and the filter defines a filter dimension that is at least twice a corresponding cooler core dimension of the cooler core, the filter dimension and the corresponding cooler core dimension both extending in the translation direction.

20. The cooler of claim 19, further comprising a second suction channel fluidly coupled to the blower and being located on an opposite side of the plurality of sides of the cooler relative to the side on which the suction channel is located.

* * * * *